(No Model.) 3 Sheets—Sheet 1.
F. TRUMP & W. A. SCOTT.
LAWN MOWER.
No. 373,501. Patented Nov. 22, 1887.
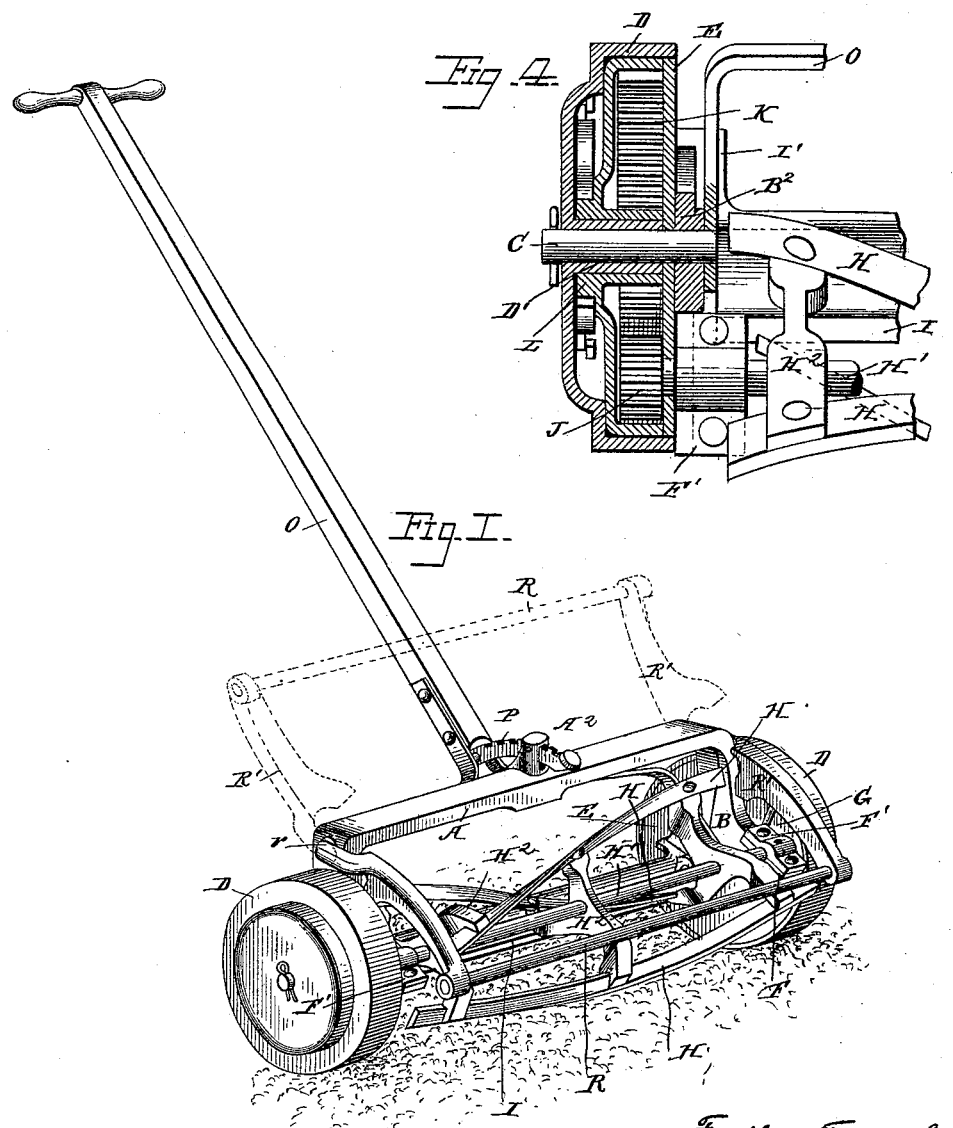

(No Model.) 3 Sheets—Sheet 2.
F. TRUMP & W. A. SCOTT.
LAWN MOWER.
No. 373,501. Patented Nov. 22, 1887.
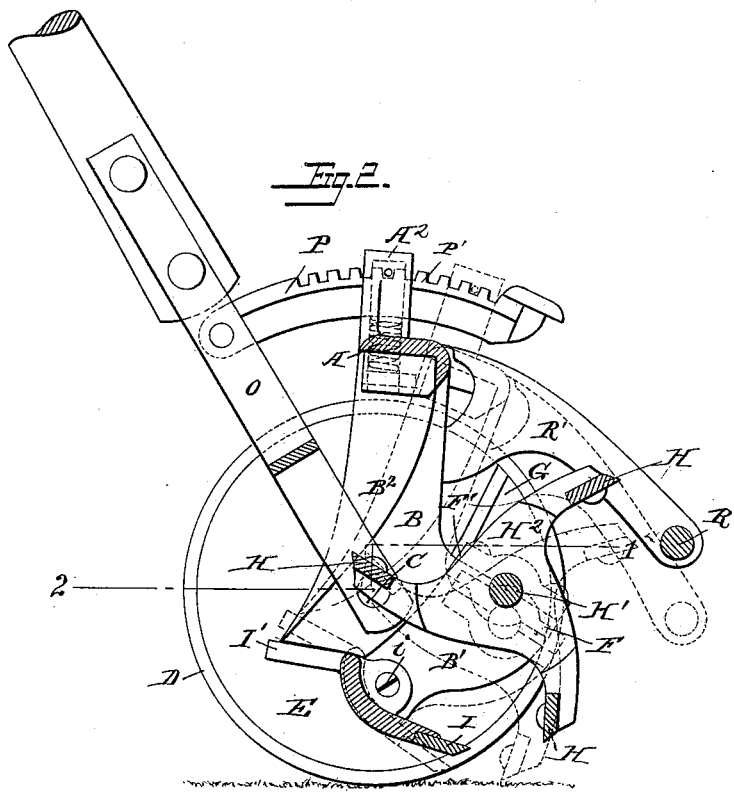
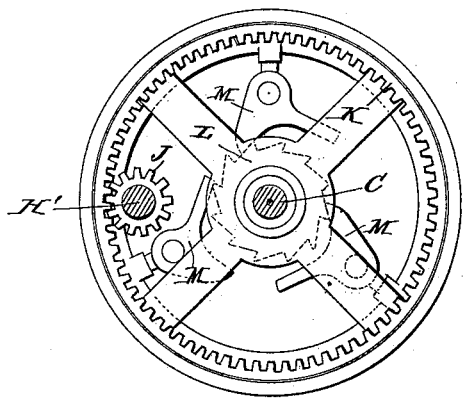

(No Model.) 3 Sheets—Sheet 3.
F. TRUMP & W. A. SCOTT.
LAWN MOWER.
No. 373,501. Patented Nov. 22, 1887.
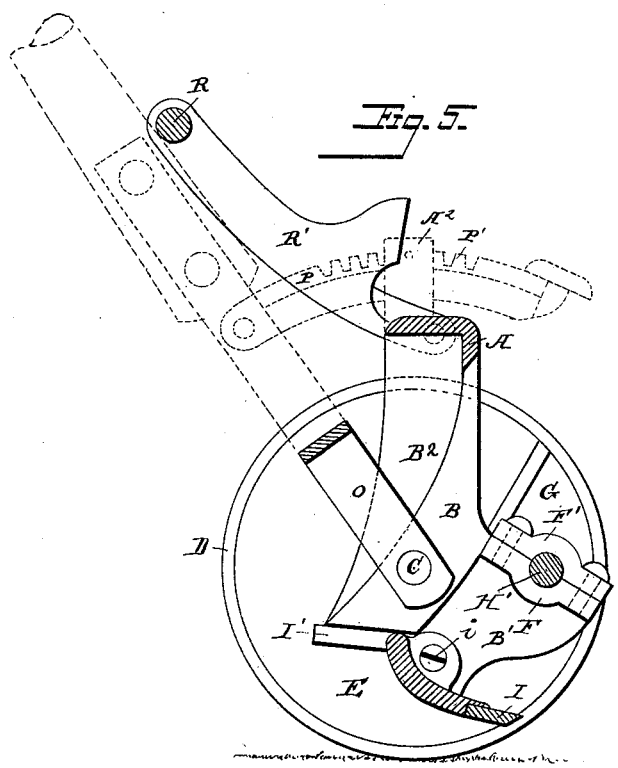
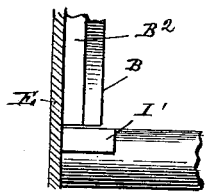

UNITED STATES PATENT OFFICE.

FULLER TRUMP AND WILLIAM A. SCOTT, OF SPRINGFIELD, OHIO.

LAWN-MOWER.

SPECIFICATION forming part of Letters Patent No. 373,501, dated November 22, 1887.

Application filed August 25, 1886. Serial No. 211,840. (No model.)

*To all whom it may concern:*

Be it known that we, FULLER TRUMP and WILLIAM A. SCOTT, citizens of the United States, and residents of Springfield, Clark county, Ohio, have invented certain new and useful Improvements in Lawn-Mowers, of which the following is a specification.

Our invention relates to that class of lawn-mowers in which a series of revolving spiral knives are rotated in cutting contact with a stationary knife placed tangentially to the rotary knives, and in which the gears for driving the cutter-shaft are inclosed in the flanged driving-wheels; and our invention consists more especially in certain improvements in such machines, which are pointed out hereinafter.

In the accompanying drawings, forming part of this specification, Figure 1 is a perspective view of a lawn-mower embodying our improvements. Fig. 2 is a transverse section of the same, showing the parts in two positions. Fig. 3 is a plan of one of the driving-wheels with the inside disk removed, showing the gearing. Fig. 4 is a sectional view of Fig. 2 on line 1 2. Fig. 5 is a sectional view of Fig. 4, with the reel removed; and Fig. 6 is a detail view showing the relation of the parts I' and B².

The main frame or cross-head A of the machine is provided with arms B, and from these arms project the studs C, forming bearings for the driving-wheels D. These wheels consist of flanged caps or boxes having inwardly-projecting hubs D', fitting the bearings C, and disks E, fitting the interior of the caps, are secured to or form part of the arms B of the cross-head, and serve to prevent the cuttings from passing into the gears and impeding the working of the machine. Secured to or forming part of the disks are the journal-boxes F F'. One of the parts, F', of the boxes forming the cap-pieces is preferably connected to removable sections G of the disks, which are large enough to allow the passage of the gear-wheels when it is desired to remove the revolving cutters. In order to insure a wide bearing in the journals, I prefer to extend forward the arms B, so as to form an additional support, B', to the journal-boxes, and thereby to hold them rigidly in place. In these bearings rotates the cutter-shaft H', having arms H², carrying the revolving spiral cutters H, which operate in connection with the fixed cutter I, secured to the lower extremities of the arms B.

In order that the stationary cutter I may be held securely in place, I form the arms B with projecting ledges B², against which the rear end of the cutter-carrying plate I' abuts, so that any tendency of said cutter to get out of adjustment is overcome, and at the same time it may be readily detached and adjusted by the screws *i*.

Motion is imparted to the revolving cutters by means of pinions J, secured to the ends of the shaft H', and projecting into the box-wheels, where they mesh into the large internal gear-wheel K, fitting loosely upon the hub D', which serves as a journal.

Connected with the large gear-wheels are ratchets L, and arranged in proper relation thereto and secured to the outer disks of the driving-wheels are means for engaging said ratchets and propelling the large gear, and while various forms of such means may be used we prefer those shown in the drawings, and consisting of gravity-pawls M, supported upon studs cast in the outer disks of the wheels. By this arrangement the power of the driving-wheels is transmitted directly to the cutter-shaft through the medium of the large gear-wheel, and as there is only one train of gears they may be made larger and stronger than when the usual two train-gear is used, and at the same time the driving-wheels need not be so broad.

It is often desirable to adjust the cutters to cut the grass at different heights from the ground, and in order to provide a simple means for such adjustment we preferably attach the handle O to the arms B by a pivotal connection O' at the central axes or studs, C, and connect the handle and main frame A by means of a segment, P. It will readily be seen that as both the stationary and the revolving cutters have their bearings in the arms B of the frame or cross-head A, and are fixed in regard to each other, and as the cross-head and handle both have a movement around the same pivotal point, assuming the position of one—as the handle—to be substantially fixed, the movement of the other to and from the handle will cause the cutters H and I to operate in different planes, as clearly seen in Fig.

2 by full and dotted lines, and the segment P, being provided with suitable devices for adjusting and holding the handle and cross-head in relative position, the cutters may be adjusted so as to cut the grass at various lengths to suit the wishes of the user. We have shown the segment P as being provided with a rack, P', engaging a spring-controlled pin in the stud A² of the cross-head; but it is evident that any other well-known and suitable means of adjustment may be used.

While we do not desire to limit ourselves to the exact construction and arrangement of the segment shown, we have found that to be very convenient, as the relation of the cross-bar and handle can be readily changed by simply putting the foot or hand upon the end of the segment, releasing it from the holding device and adjusting the handle to or from the cross-bar.

While in the lawn-mower herein described the handle is pivoted at the central axis of the machine, whereby the segment is permitted to move in a direct line with and at a uniform distance from the axis, preventing the segment from becoming disengaged from the pin in the stop, still we do not wish to limit our invention to the exact construction described, as the handle may be pivoted at a point other than the central axis.

It will be seen that in the arrangement and construction shown in the drawings the revolving cutters H project in front and beyond the driving-wheels, and we have found that in using the machine the cutters may be run against an obstacle, either injuring the cutters or cutting the obstacle; and in order to prevent such mishaps we have provided the machine with an adjustable guard, R, consisting of a rod supported in arms R', pivoted to some convenient part of the frame or handle, as at r, so that it may be thrown back onto or toward the handle when not in use.

It will thus be seen that we have shown a complete operative machine embodying several features of invention, and while we have found it convenient to use them all in a single organization our invention not only comprises the use of the devices in such combination, but in combination with other devices with which they may be adapted to be used.

We are aware that it is old to adjust the cut by changing the relations of the yoke and handle; and, further, that it is also old to put the yoke and handle upon the same pivot, the height of the cut, however, being adjusted by adjusting the ground-roller in the rear of the driving-wheels.

What we claim is—

1. The combination, in a lawn-mower, of a yoke, a stationary and rotating cutter supported in said yoke, and a handle having a common pivot with the yoke and adjustable with relation to the yoke, whereby the height of the cut may be changed, substantially as described.

2. The combination, in a lawn-mower, of a yoke and cutters carried thereby, a handle having a common pivot with the yoke, and a segment connecting the yoke and handle, whereby the height of the cut may be adjusted, substantially as described.

3. The combination, in a lawn-mower, of a handle pivoted at the central axis of the machine, a yoke carrying cutters movable about said axis, and a segment for controling said movement, whereby the height of the cut may be varied, substantially as described.

4. The combination, with a yoke supported upon the axis of the driving-wheels, of a stationary cutter secured in the yoke, a rotary cutter supported in bearings in said yoke, a handle pivoted upon the axis of the driving-wheels, a segment-arm connected to the handle, and a segment-engaging device upon the yoke, whereby the relations of the yoke and handle may be varied to produce an adjustable cut, substantially as described.

5. The combination, in a lawn-mower, of a yoke carrying stationary and rotating cutters and a guard pivoted to the yoke and extending in front of the rotating cutters, substantially as described.

6. The combination, in a lawn-mower, of the driving-wheels, the disks, a yoke supported thereby, a handle supported independently of the yoke, and a single adjustable connection between the yoke and handle centrally located between the disks, whereby the relation of the yoke and handle may be changed to vary the height of the cut, substantially as described.

7. The combination, in a lawn-mower, of the driving-wheels, the disks supported thereby, stationary and rotary cutters, a yoke pivotally mounted on the axle of the disks and carrying the stationary and rotary cutters, and having thereon one portion of an adjusting device, and a pivoted handle mounted independently of the yoke and carrying another portion of the adjusting device, said adjusting device consisting of a curved arm and an engaging device, whereby the relations of the handle and yoke may be adjusted to carry the cut, substantially as described.

In testimony whereof we have signed our names to this specification in the presence of two subscribing witnesses.

FULLER TRUMP.
WM. A. SCOTT.

Witnesses:
C. A. SCOTT,
CHAS. J. WATTS.